April 14, 1959     E. LAMMERZ     2,881,641
HYDRAULIC POWER TRANSMISSION
Filed Nov. 13, 1953     2 Sheets-Sheet 1
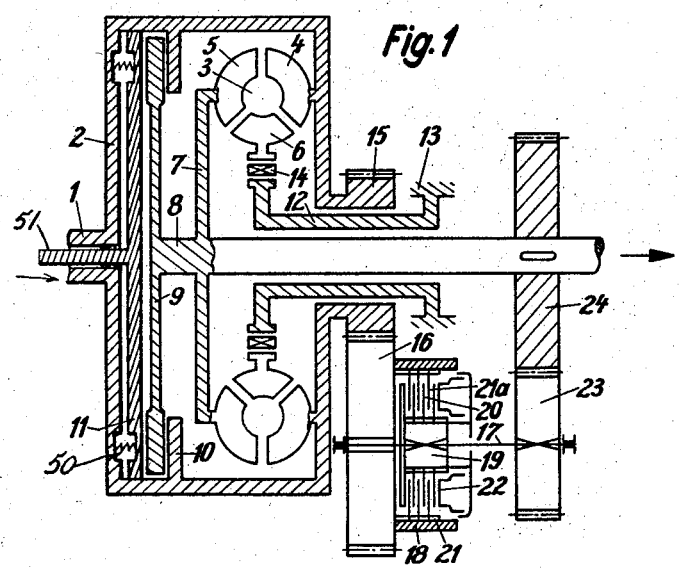
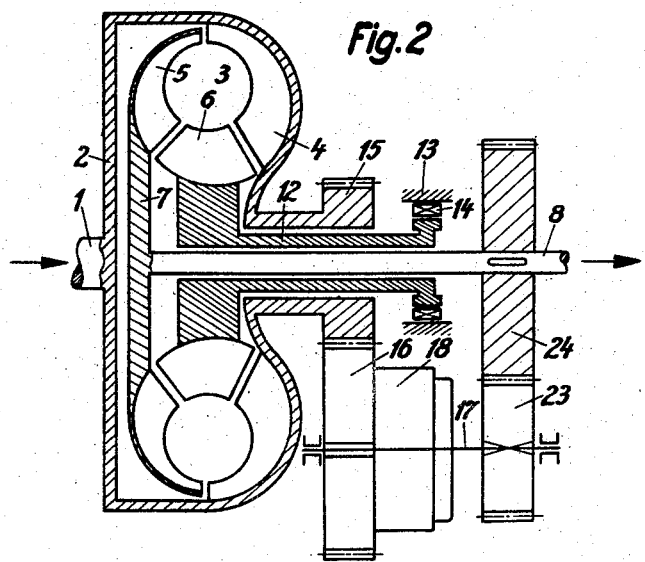
*Inventor:*
ERNST LAMMERZ April 14, 1959  E. LAMMERZ  2,881,641
HYDRAULIC POWER TRANSMISSION
Filed Nov. 13, 1953  2 Sheets-Sheet 2

Inventor:
ERNST LAMMERZ

United States Patent Office 2,881,641
Patented Apr. 14, 1959

2,881,641

HYDRAULIC POWER TRANSMISSION

Ernst Lammerz, Essen, Germany, assignor to Aktiengesellschaft für Unternehmungen der Eisen- und Stahlindustrie, Essen, Germany, a corporation of Germany Application November 13, 1953, Serial No. 392,023

Claims priority, application Germany November 14, 1952

4 Claims. (Cl. 74—730)

In connection with propulsion of vehicles by means of motors which operate within only a limited number of revolutions, for example, in the propulsion of automobiles by means of combustion engines, reduction gears are required to reduce the number of revolutions and to provide a corresponding multiplication of the engine torque under different driving conditions (starting, up hill driving, high speed gear, etc.). The transmission system presently used for this purpose has several reduction gears and may, moreover, be used for various degrees of braking of the vehicle axles using the "dragging moment" which is increased by the insertion of an intermediate gear, required for turning the engine at more or less reduced fuel feed, as a means of braking the revolving axles of the vehicles. This braking effect of the motor—which causes no wear and tear of brake shoes and therefore is especially useful for long descents—in general practice is used so that on descent the same gear position is used as on a corresponding ascent. In particular on long, steep slopes automobiles may be driven in their lowest gear at low speed and with sufficient braking effect.

In order to reduce or completely eliminate the large number of gear positions particularly on heavy trucks, gears are equipped with hydraulic power transmission systems, for example, the so-called turbo-transmission systems where the pump wheel of the turbo transmission system is mechanically coupled with the engine and the turbine wheel with the driven shaft. Since, as generally in turbo transmission systems, a positive connection between the driving side and the secondary drive is absent, and moreover, the power transmission is quadratically decreased in the transmission system as the revolutions are reduced, a braking effect caused by dragging the motor is not readily available in this case. If the gear is designed in a well-known manner so that the pump wheel is adapted to be directly coupled to the turbine wheel, a braking effect by dragging the motor in this gear position, is again possible, however, with either only one single unchangeable amount of braking moment, or corresponding to the two positions of a supplementary two-ratio gear for up hill and level driving.

The braking effect of the motor may be increased when the pump and turbine wheels are coupled directly by not releasing the guide wheel, as is usually done, and by not letting it run at the same number of revolutions, but by stopping it or even letting it turn in the opposite direction. The turbo converter is then especially inefficient and uses a great deal of energy, as the number of revolutions is increased, thereby however heating up so rapidly that this method of braking is possible only for short down hill drives and, moreover, at not too low speeds. A braking effect action of the motor which is sufficiently effective and reliable even at prolonged down hill driving and down to the lowest speeds, as in purely mechanical multiple position gears, cannot be achieved in this manner.

A further difficulty in the use of hydraulic power transmission systems resides in the impossibility of driving economically at low speeds, corresponding approximately to the lowest speed of a mechanical transmission system; for example, driving up hill for an extended stretch with heavy loads, since the lowest obtainable permanent speed—even where there is a two-step supplementary gear—and hence the speed at which one may drive with a tolerable degree of efficiency, frequently is still too high.

According to the invention both the above disadvantages are removed by providing in a hydraulic power transmission system, a gear position in which the engine is simultaneously coupled with the driven shaft through the turbo transmission system and in parallel thereto through a constant reduction mechanical gear.

In the above gear position the turbo transmission system therefor, according to the selected reduction of the mechanical auxiliary gear, always revolves with a definite relation of revolutions between pump and turbine shaft, so that one may speak of a "blocked reduction gear." The reduction of this gear must be such that the turbo converter works within the region of a good degree of efficiency preferably in the one prevailing at the lowest (maintainable) speed in the actual operation of the turbo converter only.

When driving in this gear position a distribution of torque from the engine to the converter, on the one hand, and to the mechanical auxiliary gear, on the other hand takes place. This distribution of performance varies with the number of revolutions of the motor insofar as the motor torsional moment, which remains approximately the same, is taken up at strongly reduced number of motor revolutions almost solely by the auxiliary gear, while with increasing number of motor revolutions an increasingly greater portion (increasing quadratically) goes through the turbo transmission system until, at a certain number of motor revolutions, the auxiliary gear is completely by-passed. If this final number of revolutions is so chosen in the "blocked" gear step that it corresponds to the lowest maintainable required speed at the turbo transmission drive only, the lowest maintainable speed gained by the "blocked" reduction gear, at the maximum moment of the motor, is still lower, corresponding to the remaining portion of the range of adjustment of the motor output.

If one brakes in the same gear step by dragging the motor, the braking effect is enhanced, in addition to the motor drag moment which is being multiplied in accordance with the mechanical reduction, by the loss in efficiency in the turbo transmission system which is dragged at the same time in accordance with its degree of efficiency in the respective point of operation. In a gear design in which the rotating guide wheel is fixed by means of a brake band for the operation of the turbo converter system, the brake band may also be released during braking by the "blocked reduction" gear.

In both instances the invention fills the above described need for improving the economy and safety of driving at slow speed when using a hydraulic power transmission system especially on steep up and down grade roads.

The reduction by the auxiliary mechanical transmission system need not be as large as the entire gear reduction by an ordinary mechanical multiple step gear, since, for example, the turbo transmission increases the effectiveness of the braking. Of course, it need not be greater than that given by the increase of moment when starting with the turbo transmission system without using the auxiliary gear. It should, however, correspond to at least the ratio of two adjoining gear steps of a mechanical multiple step gear.

In gears for trucks one will have to select a reduction of about 1:3 to 1:4, for passenger and other light cars at least 1:1.5, if the turbo transmission is so designed that it approximately quadruples the torque of the motor when the car is started. In the "blocked" gear the transmission then works at such a favorable degree of efficiency that the normal cooling will be sufficient or at least will need only a small increase.

The efficiency of the gear in the "blocked" gear step, which of course is always between that of the turbo transmission system in the respective point of operation and that of the mechanical auxiliary gear, is dependent on the distribution of torque at the output.

If it is possible to take full advantage of the speed range of the gear, the turbo transmission system as above mentioned, transmits the entire motor torque and the gear runs with the efficiency of the turbo transmission system. The more the load increases, for example, on a steep hill and with heavy loads, the more the engine revolutions are reduced; the turbo converter takes up an increasingly lesser part of the engine torque, the mechanical gear a correspondingly larger part, so that finally the gear works in the manner and with the higher efficiency of a mechanical gear heavily strained in low gear. Thereby occurs a continual transfer from one mode of operation to the other.

The mechanical auxiliary gear between the engine and the driven shaft may be so designed that it is coupled to the latter through the turbine shaft of the turbo transmission system. This auxiliary gear may be coupled with the engine through the pump wheel of the turbo transmission system whereby the latter suitably forms a single unit with the housing of the turbo converter. Moreover, a direct (mechanical or hydraulical) coupling may be placed on the driving side of the turbo transmission system between the pump and the turbine wheel thereby achieving the usual direct gear (synchronous drive of pump and turbine, preferably with the guide wheel co-running).

If the mechanical auxiliary gear is designed as a spur gear system with the intermediate shift parallel to the pump and turbine shaft of the turbo transmission system, then in connection with the above-mentioned characteristics no by-passing of the turbo transmission system is necessary, which makes it possible to give the gear a more compact and space-saving design. The reduction gear for the "blocked" gear may also be located between engine and turbo transmission whereby the converter housing is suitably connected to the turbine wheel.

The first design is preferable, however, because in a further development of the invention, parts of the auxiliary gear consisting of at least two pairs of cogwheels may be designed at the same time as parts of a multiple step and/or reversing gear coupled to the output. In addition, the constantly running wheels of this gear may be used to drive auxiliary engines, for example an auxiliary pump for the fluid transmission system or a lubricating oil pump for the mechanical gear parts. By proceeding in this way the extra cost of construction for the "blocked" gear is reduced to that of one pair of cogwheels and the coupling for the additional shift. This may be designed as a friction clutch coupling, preferably as a disk clutch which may be activated hydraulically, for example, with the transmission fluid.

If there is added to the transmission a two-ratio gear for up-hill driving and for driving through long stretches of road the "blocked" gear step may be used in both of these gear positions.

The drawings show several examples of embodiments of the invention. Their arrangement and mode of operation are explained in the following. All the figures are schematic drawings in cross-sectional view.

Figure 1 is a transmission with turbo converter, mechanical auxiliary gear for the "blocked" gear step, and mechanically coupled direct gear.

Figure 2 is a similar transmission, with a hydraulically coupled direct gear instead of a mechanically coupled direct gear.

Figure 3:
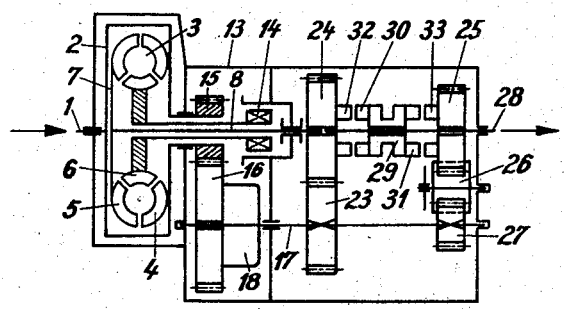
Figure 3 is a similar transmission, but with a reversing gear which uses one of the pairs of spur gears of the mechanical auxiliary gear coupled to the output.

In Figures 1 to 3, 1 designates the primary shaft of the gear which may for example take the shape of the end of a crank shaft of a diesel engine (not shown in the drawing). In a housing 2 designed as flywheel, a turbo converter system 3 is arranged in such a way that its rotating housing 2 forms a structural unit with the pump impeller 4. The turbine wheel 5 is connected through the disk 7 with the turbine shaft 8. In Figure 1 the latter also carries a clutch disk 9 which presses against the counter ring 10 at the housing 2 (=pump impeller 4), thus mechanically coupling pump and turbine wheel when the piston 11 is moved to the right under the effect of pressure. This pressure may be exerted by compression springs 50 which are positioned near the edge of piston 11 and are interposed between piston 11 and rotating housing 2 so as to bias piston 11 to the right with respect to Figure 1. An axially slidable actuating shaft 51 extends from the center of piston 11 into an opening of primary shaft 1 arranged concentrically with the rotational axis thereof. Actuating shaft 51 is normally maintained to the left with respect to Figure 1, in the position illustrated, against the force of springs 50 by a well known means (not shown). When this means is released, springs 50 force piston 11 to the right, with respect to Figure 1, thereby forcing clutch disk 9 against counter ring 10. The guide wheel 6 is rotatably arranged on a bushing 12, which forms a part of the gear box 13 (shown in Figure 3 only). This mounting takes place across a one-way clutch 14, which permits a co-running of the guide wheel 6 only in the sense of rotation of the pump and turbine wheel.

The mechanical auxiliary gear means consists, first, of a cogwheel 15 mounted on the right-hand end of the rotating transmission housing 2 and engaging a counterwheel 16, which is freely rotating on the intermediate shaft 17 and is, however, adapted to be connected to the latter by means of a multiple disc clutch 18. The inside piece 19 of this clutch with the inside laminations 20 is fastened on the intermediate shaft 17, the outer piece 21 with the outside laminations 21a on the counter-wheel 16. The clutch effect is produced by pressing together the laminations 20 and 21a by means of the hydraulically operated piston 22. A second pair of cogwheels consists of the cogwheel 23 attached to the intermediate shaft 17 and the engaging cogwheel 24 fastened to the turbine shaft 8 of the turbo converter system 3.

The total reduction of speed by the two pairs of cogwheels 15, 16 and 23, 24 amounts to approximately 1:3 to 1:4 in gears for trucks; for lighter vehicles, such as passenger automobiles, it is less, however, at least half as much.

The operation of the parts so far described in the various driving and gear positions is as follows:

When using the normal turbo converter system, for example, starting the car, the working fluid (not shown) agitated by the rotation of the primary shaft 1, the transmission housing 2 and the pump wheel 4, drives the turbine 5, the disk 7 and the turbine shaft 8 with the usual torque conversion. The multiple plate coupling 18 is thereby disengaged, so that the cogwheel pairs 15, 16 respectively, 23, 24 rotate corresponding to the different number of revolutions of the primary shaft 1 and the turbine shaft 8.

After driving to the limit of the speed range of the transmission system the direct coupling between pump wheel 4 and the turbine wheel 5 is activated, for example as in Figure 1, by pressing the coupling disk 9 against the counter disk 10 by means of the piston 11. The guide wheel 6 is thereby disengaged from the one-way clutch 14, on which it was resting, and revolves in the same direction and with the same number of revolutions as the pump wheel 4 and the turbine wheel 5.

For steep up or down grade driving the "blocked" gear is used by engaging the coupling 18 (after disengaging the direct coupling, if necessary), thereby putting in gear the auxiliary reduction gear consisting of the wheels 15, 16, 23, 24. In up hill driving the motor, by distribution of performance is effective simultaneously through the converter and the auxiliary gear onto the reduction shaft 8. In downhill driving and with released gas pedal the reduction shaft 8 drives rearwardly from the vehicle through the auxiliary gear the housing 2 and thereby drives the engine; in addition however, the converter is also operating, whereby it returns to the turbine shaft 8 i. e. the reduction shaft merely a portion of the initial power reduced in relation to the degree of its effectiveness. The resulting brake effect therefore exceeds the effect which is obtainable by merely dragging the motor through the auxiliary gear.

In the arrangement shown in Figure 2, the mechanical coupling between pump wheel and turbine wheel in the transmission system is replaced in the following manner: the guide wheel 6 is adapted to be coupled by the working fluid to the turbine wheel 5, thereby changing the turbo converter system to a simple hydraulic coupling (without converting the torque). Otherwise design and performance are the same as in Figure 1.

The arrangement shown in Figure 3 includes additionally a secondarily arranged spur-wheel reversing gear, wherein, by simultaneous use of the second pair of cogwheels 23, 24 of the mechanical auxiliary gear, only the cogwheels 25, 26 (as reversing wheel) and 27 (on the intermediate shaft 17) are added. The wheels 24 and 25 are thereby mounted freely rotatably on the reduction shaft 28; they may be connected to this shaft, however, in the following manner: a gear shift sleeve 29 sliding endwise on the shaft 28 with claws 30, 31 on either side is made to engage either with the counter claws 32 of the wheel 24 (forward gear) or with the counter claws 33 of the wheel 25 (reverse gear). Therefore only three additional cog wheels are required for the transmission system (in addition to the gear shift sleeve).

Figure 4:
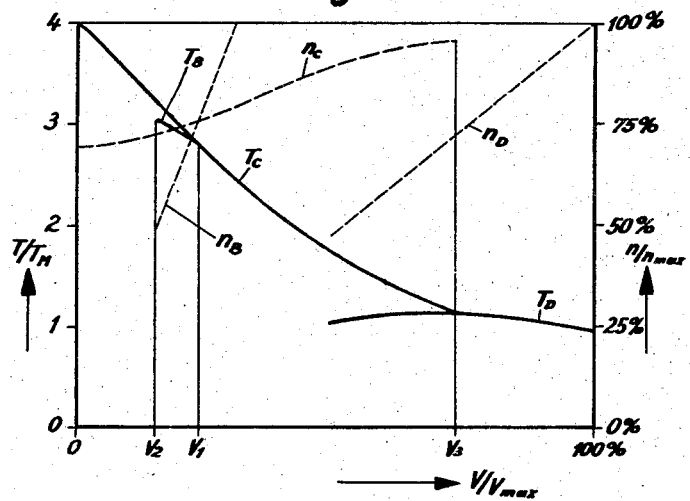
Figure 4 is a diagram showing the plot of the values of traction and number of revolutions of the motor with respect to the speed of the vehicle for a gear system according to the invention applied to a truck powered by a diesel motor.

The diagram of Figure 4, above the speed V of the vehicle, which is plotted on the horizontal axis in percentages of the maximum speed $V_{max}$, shows the course of traction power $T_C$ (converter gear) and $T_D$ (direct coupling), in form of multiples of the engine torque $T_M$, as well as the corresponding number of motor revolutions $n_c$ and $n_D$ in percentages of the maximum number $n_{max}$ of revolutions. Thereby it is assumed that when starting in the turbo converter system and when shifting to the direct coupling the number of engine revolutions is reduced down to 75%. Furthermore, reaching to the left from the lowest maintainable speed $V_1$ in the turbo transmission system, the corresponding values $T_B$ and $n_B$ for the "blocked" gear step are shown. The reduction of the lowest maintainable speed $V_1$ (in the operation of the turbo converter only) to the value $V_2$ (according to the above with increase of the amount of effectiveness) results from the smallest prevailing possible number of engine revolutions of 50%. The speed $V_3$ is that speed at which one ordinarily shifts from the turbo converter system to the direct coupling.

Those skilled in the art will realize that although all of the figures do not illustrate shaft fluid seals such seals may readily be inserted where it is desired to confine the liquid, driving and lubricating, to a particular chamber such as the box 13 (Figure 3).

In the foregoing, the invention has been described solely in connection with specific illustrative embodiments thereof. Since many variations and modifications of the invention will now be obvious to those skilled in the art, it is preferred to be bound not by the specific disclosures herein contained but only by the appended claims.

I claim:
1. A variable speed power transmission arrangement, especially for use in motor vehicles, comprising in combination: an input shaft adapted to be driven by a prime mover; and output shaft; a turbo torque converter having an impeller operatively connected with said input shaft, and a turbine operatively connected with said output shaft; an auxiliary gear of fixed reduction; clutch means adapted to couple said input shaft with said output shaft by means of said auxiliary gear thus effecting a speed range in which said input shaft may be operatively connected with said output shaft simultaneously through said turbo torque converter and through said auxiliary gear operatively connected in parallel with said turbo torque converter.

2. A variable speed power transmission arrangement according to claim 1 in which the degree of reduction of said auxiliary gear is so designed that in said speed range said turbo torque converter operates within a favorable efficiency range, preferably to that amount which exists at the lowest maintainable speed when driving only through said turbo torque converter.

3. A variable speed power transmission arrangement according to claim 1 which comprises clutch means adapted to couple said input shaft directly with said output shaft thus effecting another speed range in which said output shaft rotates with the same speed as said input shaft.

4. A variable speed power transmission arrangement, especially for use in motor vehicles, comprising in combination: an input shaft adapted to be driven by a prime mover; an output shaft; a turbo torque converter having an impeller operatively connected with said input shaft, and a turbine operatively connected with said output shaft; an auxiliary gear of fixed reduction; clutch means adapted to couple said input shaft with said output shaft by means of said auxiliary gear thus effecting a speed range in which said input shaft may be operatively connected with said output shaft simultaneously through said turbo torque converter and through said auxiliary gear operatively connected in parallel with said turbo torque converter; a multiple speed transmission which is sequentially arranged to said turbo torque converter and comprises gear wheels also serving simultaneously as parts of said auxiliary gear.

References Cited in the file of this patent
UNITED STATES PATENTS

| | | |
|---|---|---|
| 2,606,460 | Kelley | Aug. 12, 1952 |
| 2,606,461 | Herndon | Aug. 12, 1952 |
| 2,671,359 | Scheiter | Mar. 9, 1954 |
| 2,672,767 | Schneider | Mar. 23, 1954 |
| 2,682,786 | Flinn | July 6, 1954 |
| 2,749,773 | Simpson | June 12, 1956 |